3,450,158
PARALLEL CHECK VALVE SUCH AS USED
FOR VEHICLE BRAKING
Ralph B. Tilney, Clayton, and George H. Chapman,
Olivette, Mo., assignors to Alco Controls Corporation,
Creve Coeur, Mo., a corporation of Missouri
Filed Oct. 14, 1966, Ser. No. 586,826
Int. Cl. F16d 65/24; B60t 11/10
U.S. Cl. 137—598                                11 Claims

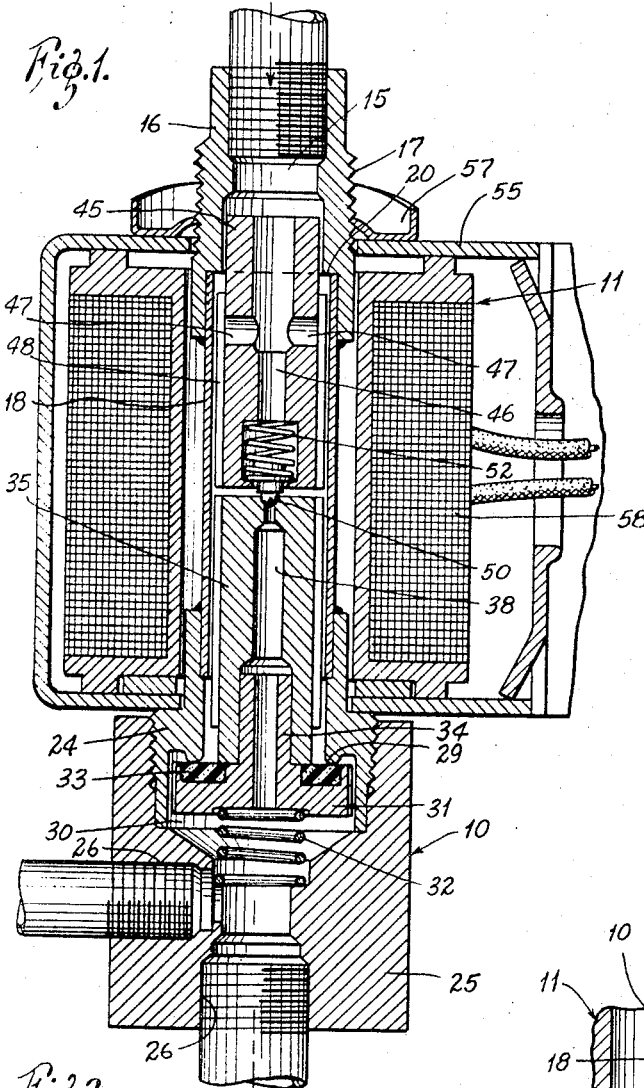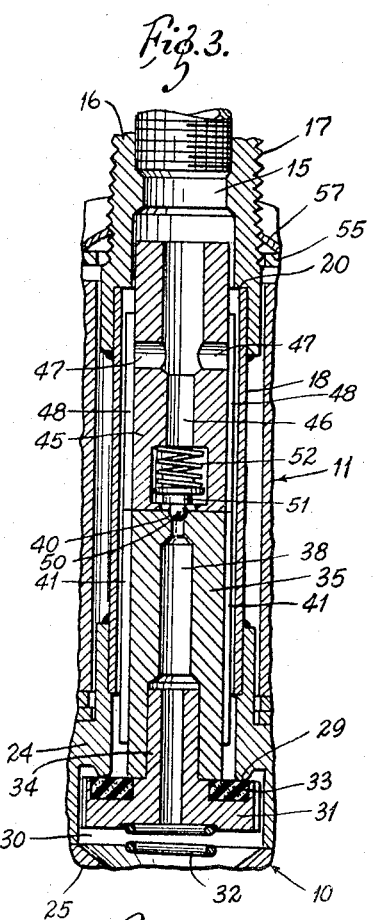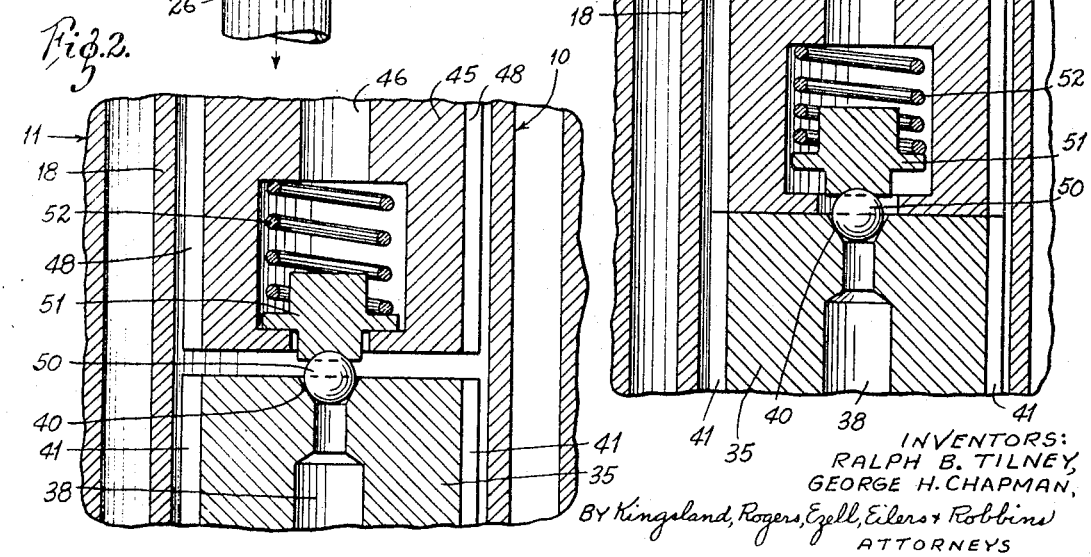

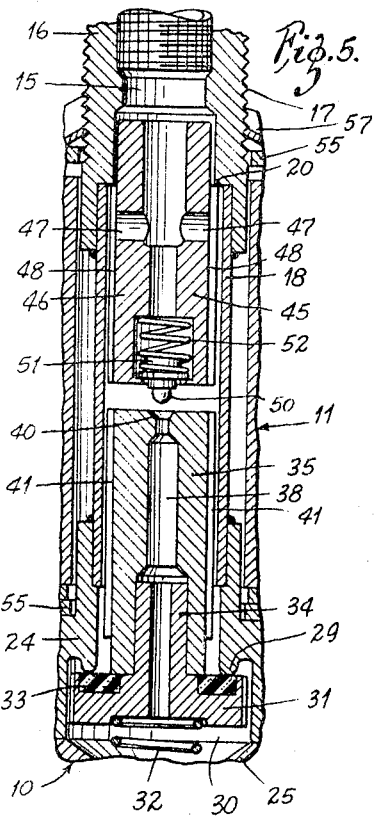
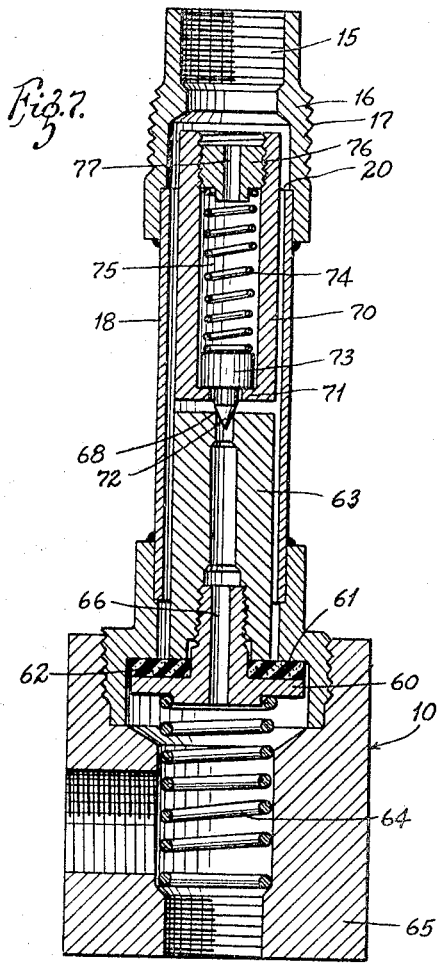
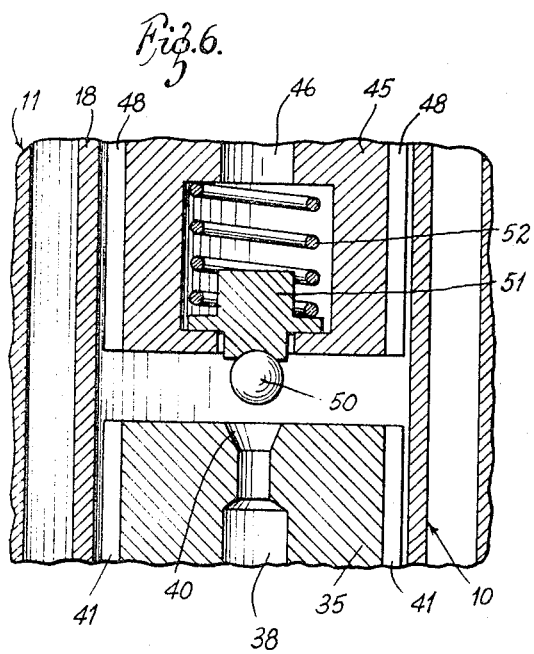
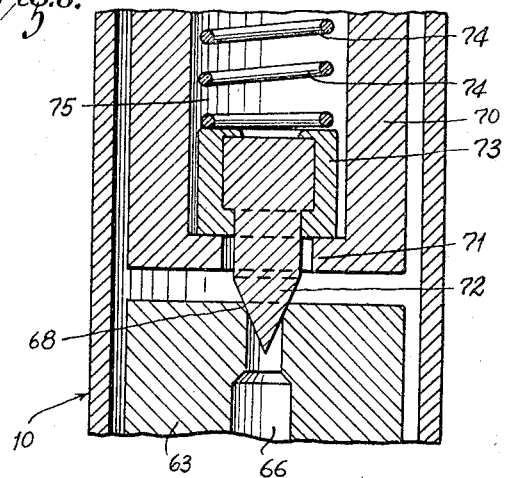
INVENTORS:
RALPH B. TILNEY
GEORGE H. CHAPMAN,
By Kingsland, Rogers, Ezell, Eilers & Robbins
ATTORNEYS United States Patent Office 3,450,158
Patented June 17, 1969

ABSTRACT OF THE DISCLOSURE

A magnetically controlled check valve has a primary poppet valve closed against applied pressure. It has a magnetic core for a stem projecting through the valve seat and having a bypass passage through it; a second magnetic core contains a floatingly mounted bypass valve that can close the end of the bypass opening in the primary valve magnetic core stem. When the magnetic coil surrounding the cores is not energized, the primary valve can be opened by applied pressure. When the applied pressure is released, the primary valve is normally closed by a spring but the back pressure is relieved through the bypass, the pressure of the fluid pushing the bypass plunger away from the primary valve stem to open the bypass valve. When the magnetic coil is energized, it acts on both cores to hold the bypass valve firmly in closing position and prevents return flow of liquid and also holding the primary valve firmly against its seat.

---

The present invention relates to a parallel check valve device. It has a particular use in connection with instaneous brake release for racing automobiles. It incorporates a primary poppet valve that is opened to permit brake fluid to flow from a master cylinder to the brake cylinders whenever a predetermined amount of pressure is developed in the brake fluid, as occurs by normal operation of the brake pedal. The device also has a return flow passage through the poppet valve that normally permits the return flow of this fluid to the master cylinder when the pedal pressure is relieved. In addition to the foregoing, the device includes a secondary poppet valve that controls the return flow passage, and which can be firmly closed by energization of a magnetic coil, so that back flow from the brake cylinders to the master cylinder is normally prevented. However, when the magnetic coil is released, as by a switch readily accessible to the operator of the car, the secondary poppet valve can open so that the pressure in the brake cylinders is instantly relieved.

By the foregoing arrangement, the driver of the car can set his brakes and hold them firmly set until such time as he wishes to release them by operation of the switch to de-energize the coil. For very rapid starts of the automobile, the driver can put the car in gear and have it ready for abrupt take-off and even may be operating it at partial or heavy throttle position, but retarded by the brakes, so that when the brakes are suddenly relieved, the car immediately accelerates without further delay.

Another use of this parallel check valve is in connection with hill-holding devices for motor vehicles. If, as is known in the art, the magnetic coil is energized at the time brakes are applied fully, and is subsequently de-energized upon depression of the accelerator pedal, the present apparatus will prevent the car from rolling, regardless of release of the foot of the operator from the brake pedal, until he has actually depressed the accelerator pedal to obtain intentional movement. Other uses will appear from an understanding of the operation of the valve.

Prior art devices of this type have not provided the combination of two poppet valves with their rapidity of operation. The present arrangement also permits the fluid to flow in one direction and under pressure at all times so that under no circumstances can the vehicle be without braking.

In the present construction there is no fixed partition required for the secondary poppet valve. Rather the secondary poppet valve, which is mounted on a floating plunger of magnetic material, closes against the seat in the core that is a stem of the primary poppet valve. This construction eliminates the requirement for a fixed partition and makes the tolerance problems considerably easier. Furthermore, the secondary poppet valve is movable relatively to its floating plunger, but is urged in a seating direction by a relatively stiff spring. This arrangement permits the valve to be self-centering regardless of misalignment of the plungers and also can set a maximum locking fluid pressure on the outlet side of the secondary poppet valve, when the pedal or pressure-applying means is released.

The present valve arrangement is made up of relatively simple parts, most of which are standard sections or stampings or conventional machine tool parts. Also disassembly for service and repair is made easy.

In the drawings:

FIGURE 1 is a diametrical section through the valve assembly, the primary and secondary poppet valves being closed and the magnetic coil being de-energized;

FIGURE 2 is an enlarged diametrical section of the secondary poppet valve portions of FIGURE 1;

FIGURE 3 is an enlarged sectional view of the two valves with their plungers in the positions occupied when the magnetic coil is energized and the main poppet valve is closed;

FIGURE 4 is an enlarged view of the secondary poppet valve portions of FIGURE 3;

FIGURE 5 is a view similar to FIGURE 3 but with the secondary poppet valve open, the magnetic coil being released;

FIGURE 6 is an enlarged view of the secondary poppet valve portions of FIGURE 5;

FIGURE 7 is a view of the primary and secondary valve portions of a modification which in certain respects is the preferred embodiment; and FIGURE 8 is an enlarged view of the secondary poppet valve portions of the modification of FIGURE 7.

The valve device comprises a composite valve housing 10, having a magnetic coil assembly 11 about a portion thereof.

The valve housing 10 has an inlet 15 formed in a tubular screw machine part 16 having internal threads to receive an inlet tube that can be connected to a source of hydraulic pressure such as the master cylinder of a hydraulic brake system. This tubular member 16 has external threads 17 for a purpose to be described. It also has an enlarged recess into which a tube 18 fits, and is soldered. It is desirable to provide a shoulder 20 adjacent the end of the tube 18 within the fitting 16 for a purpose to be described.

The other end of the tube 18 fits in and is soldered to another machine part 24 which in turn has external threads engaging with internal threads of a valve chamber member 25. The valve body member 25 may have internally threaded fluid outlets 26 of desired number. The valve housing 10 therefore includes the fitting 16, the tube 18, the fitting 24 and the valve body member 25.

The fitting 24 has a ported partition with a circular valve seat 29, facing downwardly in the view shown. The fitting 24 and the adjacent parts of the member 25 provide a valve chamber 30 in which a poppet valve 31 is located. This poppet valve is urged upwardly by a coil spring 32 acting between its lower face and a shoulder in the body member 25.

The valve 31 has a valve seating ring 33 in it that engages against the valve seat 29 and a tubular stem portion 34 that is pressed into a stem extension 35 constituting a core of magnetic material. A passage 38 extends through the stem portion 34 and the core 35, terminating at its upper end in a valve seat 40 as shown particularly in FIGURES 2 and 3. Grooves 41 extend from the top end of the core 35 to adjacent the bottom end thereof near the valve seat 29 of the primary valve, so that fluid can at all times flow axially along the outside of the member 35.

There is a plunger 45 of magnetic material located in the tube 18 above the core 35, and extending into the fitting 16 in the manner illustrated. The core member 45 has an axial passage 46 from end to end thereof, this passage having different diameters as will appear. A cross passage 47 may also be provided along with grooves 48 that extend from near the top of the core member 45 to the bottom thereof to insure flow along the sides of the core member at all times. Above the grooves the core member 45 is of reduced diameter so that it can fit within the reduced passage of the fitting 16 and so that a shoulder on the core member can strike the shoulder 20 of that fitting and limit the upward movement thereof.

The bore 46 in the plunger 45 is enlarged toward its lower end to receive a secondary valve plug member that here is shown as including a ball valve 50 engageable with the valve seat 40 and a flanged ball holder 51 secured thereto. The plug is normally urged downwardly by a coil spring 52, until the flange strikes inturned portions on the core member 45. The plug has a loose fit in its opening, and can move laterally as well as axially therein.

A U-shaped coil supporting bracket 55 engages around the valve housing 10, its lower arm and its upper arm having aligned holes so that it can fit over the housing as indicated. At its lower end it rests on a shoulder on the fitting 24 and at its upper end it fits over the threads 17 so that it can be held in place by a nut 57. It supports a magnetic coil 58, here shown somewhat diagrammatically.

In the modification of FIGURES 7 and 8, a valve construction for the secondary valve is illustrated that in certain respects is preferable. Also there is a slight modification in the construction of the primary valve.

The valve housing 10 need not be described, since for all practical purposes it is identical to that of FIGURES 1 through 6. The main valve 60 of FIGURES 7 and 8 is engageable with a valve seat 61, here illustrated as a flat valve seat, although this is not essential. The sealing ring 62 extends to the edges of the primary valve 60 to insure a good seat. The primary valve is threaded into the core stem 63 which facilitates its removal for replacement of the ring 62. A coil spring 64 seats in the body member 65 and is stabilized against a projection instead of a recess in the valve 60. As shown, the primary valve 60 has a secondary passage through it at 66, terminating in a secondary valve seat 68.

The upper core member 70 is here shown as being flanged at 71 at its lower end with a conical secondary valve 72 projecting loosely therethrough for engagement with the valve seat 68. As shown in FIGURE 8, this conical valve 72 can be enclosed in a sheath 73 of non-magnetic material. The valve is urged downwardly by a strong spring 74 within an opening 75 extending down from the top of the core member 70, but has lateral and longitudinal movement in the plunger. The opening 75 is closed by a threaded plug 76 with an opening 77. In this arrangement, as in the former one, fluid can flow past the lower and upper core members 63 and 70 to the valve seat 61 and plunger 70 being smaller than or of different cross section from the interior of the housing.

*Assembly*

The magnetic coil may be readily removed, serviced and replaced by removing the nut 57 and lifting the bracket and coil from the housing 10. The parts are replaced by reversing this.

The valve components in FIGURES 1–6 can be serviced by unscrewing the valve body 25 from the fitting 24. This opens the interior of the valve housing for removal of the primary valve with its connected parts and the secondary valve with the magnetic plunger 45. In the case of FIGURES 7 and 8, similar operations can take place. Additionally, in FIGURES 7 and 8, the secondary valve 72 can be removed and replaced by removing the plug 76 from the top of the plunger 70.

*Operation and use*

This valve can be connected into a line leading from a master cylinder of a brake system or in any other similar connection. Thus the inlet 15 is connected to the outlet of the master cylinder, and the outlets 26 and 27 in the numbers necessary are connected to the brake cylinders. While it is desirable to mount the valve upright as illustrated, this is not essential, especially where a positive resilient means is employed to urge the plunger 45 toward the core 35, instead of relying upon fluid pressure and gravity.

Assuming the magnetic coil 58 to be de-energized, the brakes are operated in normal fashion. As soon as hydraulic pressure of a predetermined amount, such as 10 p.s.i., is developed on the upper side of the primary valve 31 and the upstream parts of the core 35 and plunger 45, this valve is displaced from the valve seat 29 against the spring 32, and liquid flows past it to the brake cylinders. In like manner in FIGURES 7 and 8, the valve 60 is moved to permit flow of liquid to the cylinders. This flow can take place under all circumstances. When the brake pedal is released and the back pressure from the brake cylinders, along with the force of the spring 32, becomes greater than the master cylinder pressure, the primary valve 31 closes. Any additional return flow then goes through the passage 38 to the ball valve 50. This valve is now held down by only the weight of the plunger 45 so that return flow simply displaces the valve off its seat, lifting the plunger as shown in FIGURES 5 and 6; thus return flow is accommodated in the normal operation. As will be understood, the operation of FIGURES 7 and 8 is the same.

When the magnetic coil 58 is energized, as for example by a switch accessible to the operator of the car, the two magnetic members 35 and 45 are drawn together as shown in FIGURES 3 and 4. This causes the secondary valve 50 to be firmly seated on the seat 40 and the spring 52 to be compressed. This is a stiff spring so that the valve is firmly seated. However, the spring and lost motion mounting of the secondary valve enable it to be self-aligning with the seat.

Under these circumstances the primary valve still will be displaced when the pressure from the master cylinder exceeds the predetermined amount, such as 10 p.s.i. However, when the brake pedal is released, the primary valve 31 instantly closes, being a poppet valve, trapping the liquid in the brake cylinders. The spring 52 is normally stiff enough to prevent the brakes from being released as long as the two core members are compressed together by energization of the coil 58.

The foregoing situation with return flow prohibited continues until the magnetic coil is released. As soon as it is released, the brakes are instantly released by back flow through the passage 38, past the now-open secondary poppet 50, as shown in FIGURE 5. It is evident that the valve device of FIGURES 7 and 8 operates the same way.

The present valve is of particular use in getting racing starts for vehicles. For example, a vehicle with an automatic transmission can have the switch controlling the magnetic coil 58 located in a position readily accessible to the driver. The driver sets the brakes by closing the switch to the coil 58 and operating the brake pedal. He then can release the brake pedal and partly depress the accelerator pedal to the point where torque is being developed through the transmission but the car is not moving because of the brakes. In order to obtain quick acceleration, the driver then releases the switch for the coil 58, whereupon the secondary poppet valve rapidly opens, relieving the brakes and permitting an instant start.

As also noted earlier herein, the valve can be used for a hill-holding device.

What is claimed is:

1. In a parallel valve: a valve housing having an inlet, an outlet, and a ported partition therebetween with a valve chamber on one side of the partition; a primary poppet valve in the chamber operable toward and from the partition to open and close the port; a secondary passage through the poppet valve to by-pass the same; yieldable means urging the valve toward the partition, the valve being oppositely open to inlet pressure whereby it can be forced open against the yieldable means by effect of the inlet pressure; a magnetic plunger in the housing movable toward and from the primary valve on the inlet side, and having a secondary valve thereon to open and close the secondary by-pass passage, and an electromagnetic coil energizable to cause the magnetic plunger to move the secondary valve with respect to the secondary passage.

2. In the valve of claim 1: the primary valve having a stem in the form of a magnetic core through the end of which the secondary passage extends, the first-mentioned magnetic plunger being at the end of said core, and both the core and the plunger being disposed toward the middle of the magnetic field area of the magnetic coil.

3. In the valve of claim 1, wherein the magnetic plunger has the secondary valve as aforesaid and the primary valve has a valve seat therefor; and one of them being resistingly yieldably mounted to permit the plunger and valve seat to come into close proximity when the magnetic coil is energized.

4. In the valve of claim 3: the secondary valve being thus yieldably mounted, and having lateral lost motion whereby to seat despite misalignment of the core and plunger.

5. In the valve of claim 1: the housing comprising a base part having the outlet therein, and the valve chamber therein, opening through the base part; a fitting removably and tightly secured in the base part to close the opening, and providing the ported partition; a tubular part secured to the fitting and projecting away from the ported partition; a second fitting secured to the end of the tubular part and having the inlet therethrough, the magnetic coil being removably fitted and secured over the tubular part, the primary poppet valve having a magnetic core constituting its stem, projecting through the ported partition and into the tubular part of the poppet housing to the mid-portion of the coil, and having a valve head removably secured to said core; the secondary passage extending axially through the valve head and core and having a secondary valve seat at its end in the core; the magnetic plunger having an axial opening through it, the secondary valve being at the end thereof, a spring urging the secondary valve outwardly of the plunger, and a removable plug in the opening backing up the spring and retaining it and the valve plug; the core and plunger being shaped relative to the inside of the tubular part to permit fluid flow at all times alongside both of them.

6. In a valve arrangement: a valve housing having an inlet, an outlet, and a valve seat therebetween; a primary valve in the housing movable to and from the valve seat; an elongated magnetic core for the valve; a bypass through the valve opening through the end of the core; a second magnetic core in the housing movable toward and from the first core and having a bypass valve adapted to open and close the bypass in the first core; a common magnetic coil associated with the housing to act on both cores to draw them together and to cause the bypass valve to close the bypass.

7. In the valve arrangement of claim 6, the coil and cores being placed relative to the coil so that the primary valve is moved to its seat when the coil is energized.

8. In the valve arrangement of claim 7: the valve housing including a tubular part, in which the cores are mounted and which is surrounded by the magnetic coil; an inlet opening into that part for admitting fluid which under pressure may act against the cores and primary valve to urge it openward, back pressure on the primary valve urging it closeward, and an outlet opening from the valve housing on the opposite side of the primary valve from the inlet.

9. In the valve arrangement of claim 6: the bypass valve being yieldably and resiliently mounted on its core so that it may engage the other core to close the bypass, and may yield to permit the cores to be brought together.

10. In the valve arrangement of claim 6, the primary valve being a poppet valve.

11. In the valve arrangement of claim 6, the bypass valve being a poppet valve supported on the second core, with a poppet valve seat on the first core which the bypass valve may engage.

References Cited

UNITED STATES PATENTS

| | | | |
|---|---|---|---|
| 2,472,544 | 6/1949 | Nissen | 137—598 |
| 2,502,118 | 3/1950 | Ashton et al. | 137—598 |
| 2,623,541 | 12/1952 | Seppmann | 137—598 |
| 2,638,118 | 5/1953 | Chandler | 137—598 |
| 2,762,476 | 9/1956 | Gaylord et al. | 137—598 X |
| 2,964,141 | 12/1960 | Schlumbrecht | 137—598 X |
| 3,106,221 | 10/1963 | Papin | 137—598 |
| 3,153,426 | 10/1964 | Milster | 137—598 |

JOHN PETRAKES, *Primary Examiner.*

U.S. Cl. X.R.

188—152